United States Patent [19]

Bernot

[11] 4,413,087

[45] Nov. 1, 1983

[54] STABLE POLYMER SOLUTIONS FOR SPRAY DRIFT CONTROL

[75] Inventor: Robert Bernot, Chicago, Ill.

[73] Assignee: Nalco Chemical Company, Oak Brook, Ill.

[21] Appl. No.: 410,217

[22] Filed: Aug. 23, 1982

[51] Int. Cl.$^3$ .............................................. C08K 5/05
[52] U.S. Cl. .................................. 524/389; 524/555; 524/379; 524/767
[58] Field of Search .................... 524/379, 555, 767

[56] References Cited

U.S. PATENT DOCUMENTS

| Re. 28,474 | 7/1974 | Anderson et al. | 260/29.6 |
|---|---|---|---|
| 2,486,191 | 7/1946 | Minsk et al. | 526/303.1 |
| 3,360,356 | 12/1967 | Vartiak | 71/65 |
| 3,989,633 | 11/1976 | Frisque | 524/379 |

OTHER PUBLICATIONS

A.C.S. Advances in Chemistry Series 125 Fractionation of Linear Polyethylene/Gel Permeation Chromatography, (1973) pp. 98–107.

Primary Examiner—Joseph L. Schofer
Assistant Examiner—Judy M. Reddick
Attorney, Agent, or Firm—John G. Premo; Robert A. Miller; Donald G. Epple

[57] ABSTRACT

A dilute solution of an acrylamide polymer having a molecular weight greater than 1,000,000 which is stable against viscosity loss reduction due to aging which comprises a major portion of water, from 0.01–3% by weight of an acrylamide polymer, and from 0.1–5% by weight of a water-soluble monohydric alcohol which contains from 1–3 carbon atoms.

4 Claims, No Drawings

STABLE POLYMER SOLUTIONS FOR SPRAY DRIFT CONTROL

INTRODUCTION

High molecular weight acrylamide polymers are often employed in the form of dilute aqueous solutions, e.g. solutions which contain between 0.01-3% by weight of the polymer. These solutions are used as flocculants, thickening agents, retention aids in paper making operations, emulsion breakers, and the like. In most instances, these dilute solutions are prepared from either dry forms of the polymers or they are prepared by inverting a water-in-oil emulsion which contains these polymers. This latter dissolution technique is described in Anderson/Frisque U.S. Pat. No. Re. 28,474, the disclosure of which is incorporated by reference.

When these acrylamide polymers have molecular weights greater than 1,000,000, the dilute solutions described above are viscous. In certain applications, this viscosity is required in order to make the solutions operative in their end use. While in most cases the dilute solutions are used shortly after they are prepared, in certain cases they must be subject to storage over long periods of time and, in some instances, at elevated temperatures. When these latter conditions occur, polymer degradation occurs as evidenced by a reduction of the solution viscosity.

If it were possible to prevent this viscosity reduction from occurring by means of using a simple chemical additive for the dilute solutions, an advance would be made in the art.

A particularly troublesome problem of the type described above resides in the storage of dilute acrylamide polymer solutions when they are used to control drifting of aqueous solutions of pesticides. This use is described in Vartiak, U.S. Pat. No. 3,360,356 which is incorporated herein by reference.

THE INVENTION

A dilute solution of an acrylamide polymer having a molecular weight greater than 1,000,000 which is stable against viscosity loss reduction due to aging which comprises a major portion of water, from 0.01-3% by weight of an acrylamide polymer, and from 0.1-5% by weight of a water-soluble monohydric alcohol which contains from 1-3 carbon atoms.

The Acrylamide Polymers

The term, acrylamide polymers, as used herein includes homopolymers of acrylamide as well as copolymers of acrylamide containing as little as 5% by weight of acrylamide groups. The invention is particularly applicable to copolymers of acrylamide which contain from between 5-50% by weight of acrylic acid which may be present as the free acid or in one of its water-soluble salt forms such as its sodium salt form.

Most frequently used in preparing dilute aqueous solutions are the acrylamide polymers having a molecular weight of 1,000,000 or more, which polymers, when present in solution at a dosage range between about 0.1-3% by weight, impart to the water in which they are dissolved a high viscosity.

The Water-Soluble Monohydric Alcohols

As indicated, these alcohols contain from 1-3 carbon atoms and are illustrated by the compounds, methanol, ethanol, n-propanol, and isopropanol. The preferred alcohol is isopropanol.

To stabilize the dilute high molecular weight acrylamide solutions of the type described above, the alcohols are added to such solutions in amounts between 0.1-5% by weight.

While the invention has applicability to all types of dilute acrylamide polymer solutions, it is particularly applicable to stabilizing aqueous formulations of drift control agents which are composed of acrylamide polymers of the type described. These products are used in a number of different agricultural sprays such as fertilizers or biocides which are dispensed from airplanes, tractors, ground rigs, or rail cars. The purpose is to provide a coherent spray with a well defined sheet which can be directed toward a target with a minimal loss of solution to drift.

The active material in drift control agents is usually a high molecular weight water-soluble polymer. In water, these large molecules are extended and hydrogen bound with water producing viscous solutions. Even at use concentrations of approximately 0.02-0.03%, the increased viscosity would be sufficient to prevent the water from being broken up into a fine mist. Instead, larger, more stringy droplets are formed which can be directed with minimal loss to drift.

Drift control agent polymers are sold in a concentrated form as solids or oil continuous emulsions. In these forms, they require mixing equipment for effective solubilization in water at use concentrations. It is, therefore, easier to distribute these products as a dilution (of approximately 1% polymer) in water which can readily be mixed with the solution to be sprayed without the use of special equipment. However, at this concentration, the polymer solutions are unstable with a decreasing viscosity on aging with a similar decrease in activity as a drift control agent.

We have found that the addition of either 2% methanol or 2% isopropanol stabilizes these dilute solution products. The following formulation, which we shall call Formula I, gives a stable solution.

| Formula I | |
|---|---|
| $H_2O$ | 92% |
| $Na_2SO_4$ | 3% |
| Isopropanol | 2% |
| High molecular weight acrylamide 30 mole % sodium acrylate copolymer having a molecular weight of about 5,000,000 | 3% |

The drift control activity of this formula was compared with Formula II, two weeks after preparation. Formula II was the same as Formula I except the isopropanol was replaced with water.

The test apparatus used for the test was a laboratory sprayer which had a flat fan spray nozzle whose tip was 19 inches from the surface being sprayed. Hereafter, the various terms have the following meanings:

The sheet refers to that concentrated portion of the liquid as it first leaves the nozzle. It appears as a concentrated sheet of liquid.

The outer periphera of the spray pattern is referred to as the edge.

The spray pattern describes the type of overall configuration of the liquid being sprayed.

In spraying, the sheet is consolidated droplets coming from the nozzle tip that appears as a triangle of water. The height of the sheet is the vertical distance from the nozzle tip to the point at which the drops become unconsolidated. The edge is the outside boundary of the spray pattern. The pattern width is the extent of the coverage sprayed on the target surface. The drift control rating of a solution is made on the following basis:

good: Most of the fine mist is gone with an easily defined sheet of 3-3½ inches height, and a well defined edge.
fair: Some fine mist is present, the sheet is lighter with a height of 1-2 inches, and a thin edge.
poor: Much mist is present, with a light sheet of ½-1 inch in height, and a thin, almost invisible edge.

The Table below shows spray test results using aged aqueous solutions dosed with the above Formulae at use concentrations. After 2 weeks storage, at both ambient and 120° F., Formula I (with 2% isopropanol) when dosed at use concentration, gives good drift control. Formula II product under the same conditions gives fair drift control when stored at ambient temperature, and poor control when stored at 120° F.

TABLE

| Product | Product Aging Time | Product Aging Temp. °F. | Product Viscosity (cp) | Product Dosage (oz/gal) | Spray Pressure (psi) | Drift Control Rating (Activity) |
|---|---|---|---|---|---|---|
| Formula I w/Isopropanol | 0 weeks | Ambient | 3900 | — | — | — |
| Formula I w/Isopropanol | 2 weeks | Ambient | 3750 | 266 | 50 | good-3" sheet 18" spray width |
| Formula I w/Isopropanol | 2 weeks | 120° | 2800 | 266 | 50 | good-3" sheet 18" spray width |
| Formula II w/o Isopropanol | 0 weeks | Ambient | 2250 | — | — | — |
| Formula II w/o Isopropanol | 2 weeks | Ambient | 2100 | 266 | 40 | fair-sheet and edge were thin, 16" spray width |
| Formula II w/o Isopropanol | 2 weeks | Ambient | 2100 | 333 | 40 | fair-sheet and edge were thin, 18" spray width |
| Formula II w/o Isopropanol | 2 weeks | Ambient | 2100 | 400 | 40 | fair-sheet and edge OK, fine mist, 17" spray width |
| Formula II w/o Isopropanol | 2 weeks | 120° | 1050 | 266 | 40 | poor-weak sheet, thin edge 16" spray width |
| Formula II w/o Isopropanol | 2 weeks | 120° | 1050 | 333 | 40 | poor-weak sheet, thin edge 17" spray width |
| Formula II w/o Isopropanol | 2 weeks | 120° | 1050 | 400 | 40 | poor-weak sheet, thin edge, fine mist, 17" spray width |

I claim:
1. A dilute solution of an acrylamide polymer having a molecular weight greater than 1,000,000 which is stable against viscosity loss reduction due to aging which comprises a major portion of water, from 0.01-3% by weight of an acrylamide polymer, and from 0.1-5% by weight of a water-soluble monohydric alcohol which contains from 1-3 carbon atoms.
2. The dilute solution of claim 1 where the acrylamide polymer is an acrylamide/acrylic acid copolymer, and the water-soluble monohydric alcohol is isopropanol.
3. A dilute solution of a high molecular weight acrylamide polymer which is stable against viscosity loss reduction due to aging which comprises a major portion of water, from 0.01-3% by weight of a high molecular weight acrylamide polymer, and from 0.1-5% by weight of a water-soluble monohydric alcohol which contains from 1-3 carbon atoms.
4. The dilute solution of claim 3 where the acrylamide polymer is an acrylamide/acrylic acid copolymer, and the water-soluble monohydric alcohol is isopropanol.

* * * * *